(12) United States Patent
Quijano et al.

(10) Patent No.: US 9,207,711 B2
(45) Date of Patent: Dec. 8, 2015

(54) DISPLAY STAND WITH CABLE ROUTING UNDERPASS

(75) Inventors: David Quijano, Fort Collins, CO (US); Owen Richard, Fort Collins, CO (US); Jonathan D Bassett, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 150 days.

(21) Appl. No.: 14/131,154

(22) PCT Filed: Jul. 22, 2011

(86) PCT No.: PCT/US2011/045003
§ 371 (c)(1),
(2), (4) Date: Jan. 6, 2014

(87) PCT Pub. No.: WO2013/015771
PCT Pub. Date: Jan. 31, 2013

(65) Prior Publication Data
US 2014/0126132 A1    May 8, 2014

(51) Int. Cl.
*G06F 1/16*    (2006.01)
*F16M 11/10*    (2006.01)
*F16M 11/20*    (2006.01)

(52) U.S. Cl.
CPC .............. *G06F 1/1601* (2013.01); *F16M 11/10* (2013.01); *F16M 11/2021* (2013.01); *F16M 2200/08* (2013.01)

(58) Field of Classification Search
USPC ............... 455/575.8, 575.1, 566; 361/679.55, 361/679.01, 679.27, 679.28, 679.2, 679.05, 361/679.26, 679.09, 679.03, 679.57, 361/679.23, 679.58, 679.06, 679.21, 361/679.22; 439/31, 165, 499; 312/326, 312/334.46, 223.2, 328, 333; 248/70, 49, 248/920, 558, 68.1, 372.1, 150, 127, 393; 16/221, 260, 367, 277, 235, 333, 343, 16/223, 342, 85, 353, 366
See application file for complete search history.

(56) References Cited

U.S. PATENT DOCUMENTS

| 5,805,415 | A | 9/1998 | Tran et al. |
| 6,266,241 | B1 | 7/2001 | Van Brocklin et al. |
| 7,349,206 | B2 | 3/2008 | Lin et al. |
| 7,497,410 | B2 | 3/2009 | Lee |
| 7,542,052 | B2 | 6/2009 | Solomon et al. |

(Continued)

FOREIGN PATENT DOCUMENTS

| JP | 11-249577 | 9/1999 |
| KR | 20040032278 | 4/2004 |

OTHER PUBLICATIONS

Advex Corporation, Gateway™ "Theft Prevention Accessories for use with Gateway™ Computers and Monitors", Advex Corporation online catalog <http://www.advex.com/gateway_accessories1.htm>, Copyright 2003, Site last updated: Jan. 6, 2014.

(Continued)

*Primary Examiner* — Hung Duong

(57) ABSTRACT

A display device stand includes a base, a first member supported by the base, and a second member supported by the first member. The first member is moveable between a collapsed position and at least one extended position, and the base provides a passage under and between opposite ends of the first member with the first member in the collapsed position.

15 Claims, 6 Drawing Sheets

(56) References Cited

U.S. PATENT DOCUMENTS

| | | |
|---|---|---|
| 7,551,432 B1 | 6/2009 | Bockheim et al. |
| 7,717,384 B2 | 5/2010 | Kim |
| 8,373,979 B2 * | 2/2013 | Hamada et al. .......... 361/679.27 |
| 2004/0150945 A1 | 8/2004 | Mache et al. |
| 2005/0152109 A1 | 7/2005 | Choi et al. |
| 2005/0201046 A1 | 9/2005 | Hwang et al. |
| 2006/0002058 A1 * | 1/2006 | Zaderej et al. ................ 361/679 |
| 2007/0295870 A1 | 12/2007 | Peterson et al. |
| 2008/0040885 A1 * | 2/2008 | Daoud et al. .................... 16/221 |
| 2010/0213330 A1 | 8/2010 | Downing |

OTHER PUBLICATIONS

PCT International Search Report, Mar. 7, 2012, PCT Patent Application No. PCT/US2011/045003, Filed Jul. 22, 2011.

* cited by examiner

DISPLAY STAND WITH CABLE ROUTING UNDERPASS

BACKGROUND

Computing systems, particularly personal computing systems, typically employ a monitor or a display screen as a display device. To provide support for the display device and allow a user to move and/or adjust the display device to various positions, a stand may be provided for the display device. As one or more electrical cables (power, data, etc.) may be connected to the display device, such cables may interfere with or limit movement and/or adjustment of the stand.

DETAILED DESCRIPTION

In the following detailed description, reference is made to the accompanying drawings which form a part hereof, and in which is shown by way of illustration specific embodiments in which the disclosure may be practiced. In this regard, directional terminology, such as "top," "bottom," "front," "back," "leading," "trailing," etc., is used with reference to the orientation of the Figure(s) being described. Because components of embodiments of the present disclosure can be positioned in a number of different orientations, the directional terminology is used for purposes of illustration and is in no way limiting. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

Figure 1:
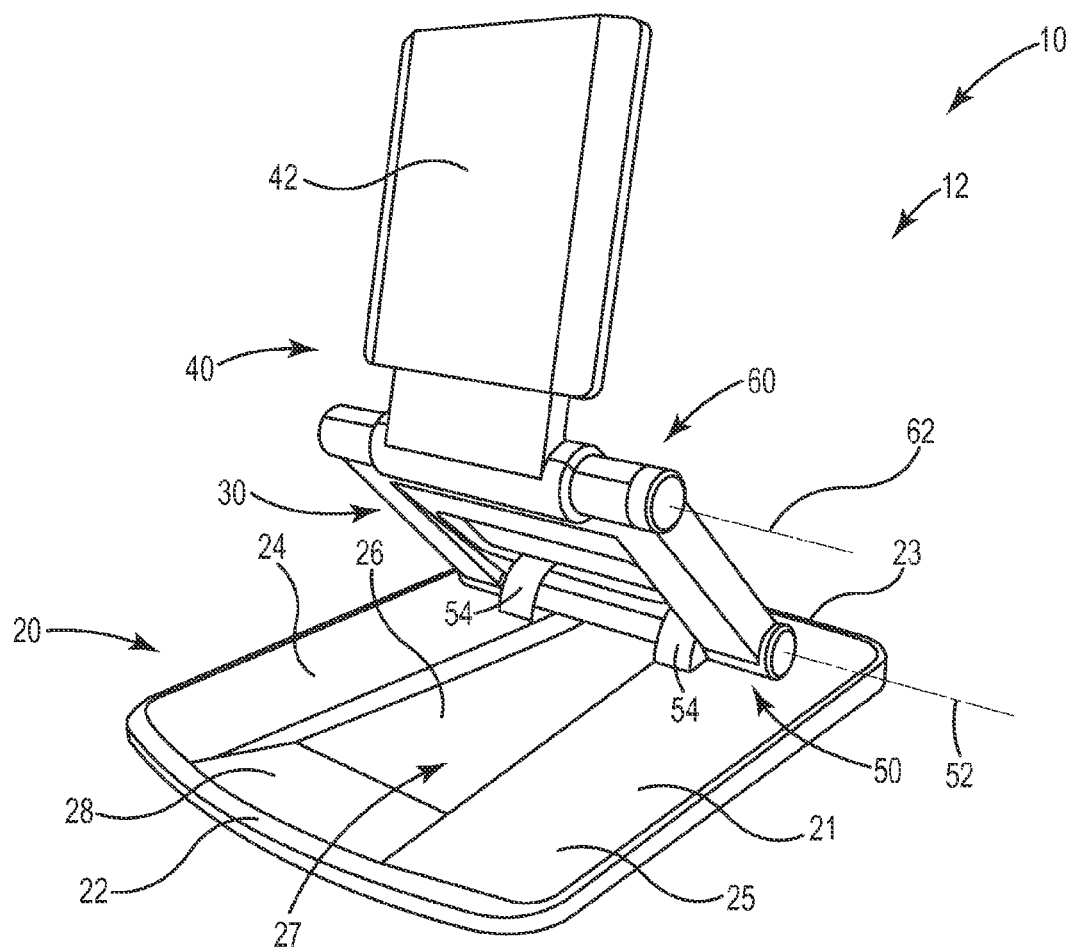
FIG. 1 illustrates a front perspective view of an embodiment of a display device stand in an extended position.
Figure 2:
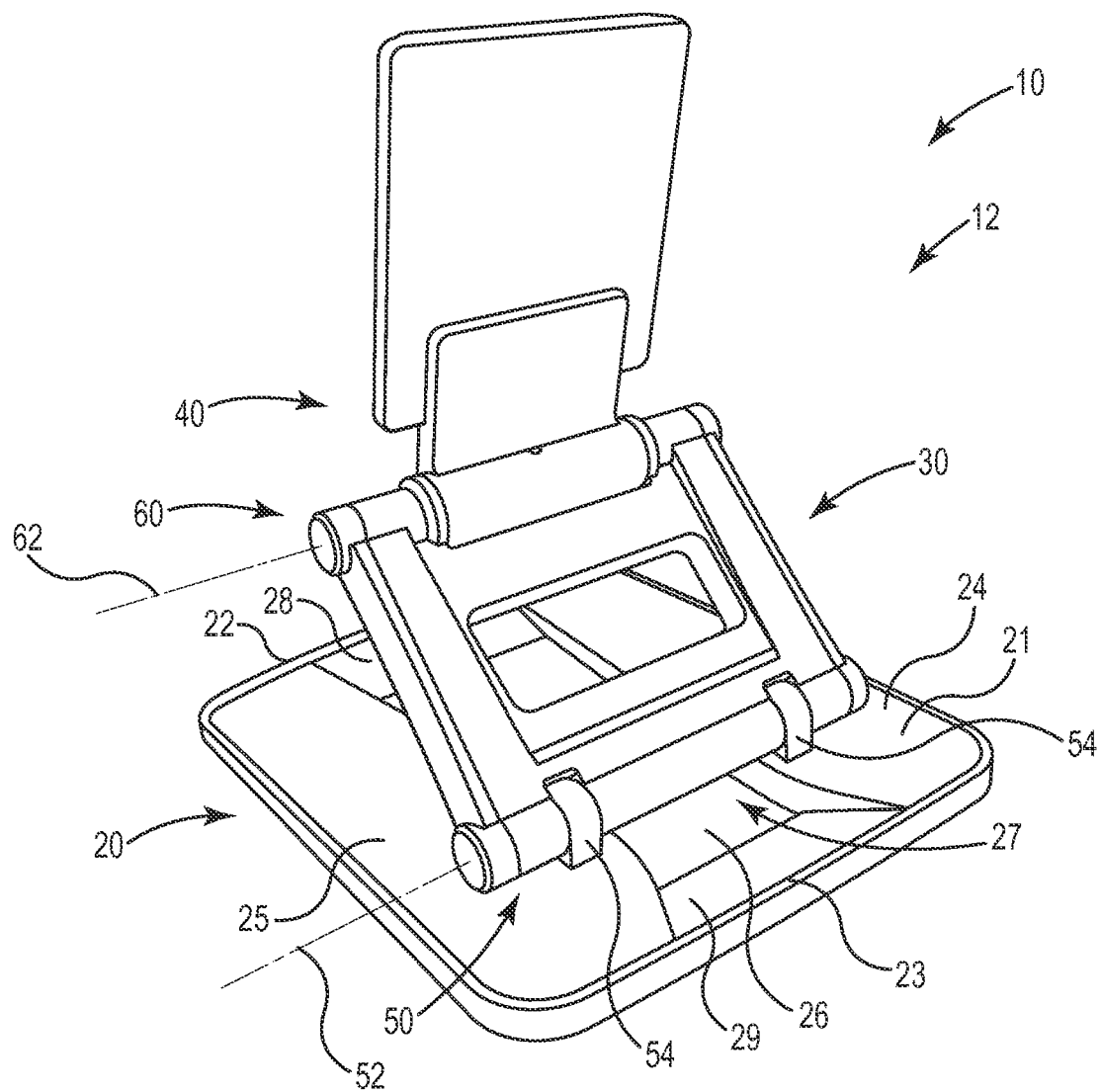
FIG. 2 illustrates a rear perspective view of an embodiment of a display device stand in an extended position.
Figure 3:
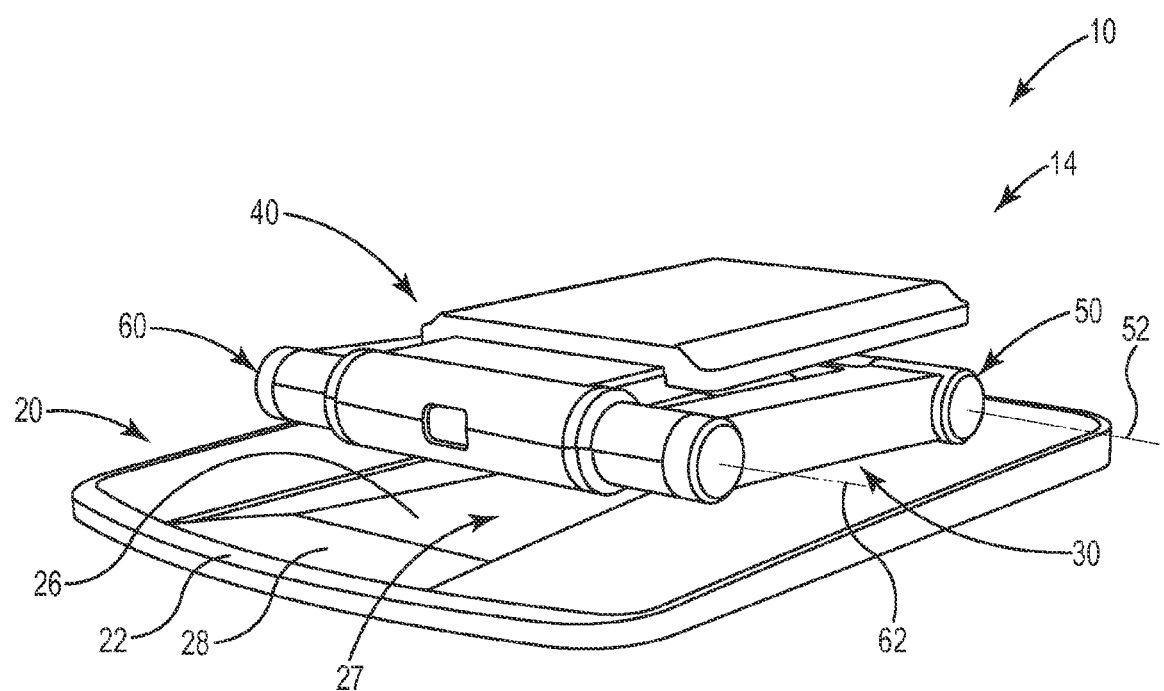
FIG. 3 illustrates a front perspective view of an embodiment of a display device stand in a collapsed position.
Figure 4:
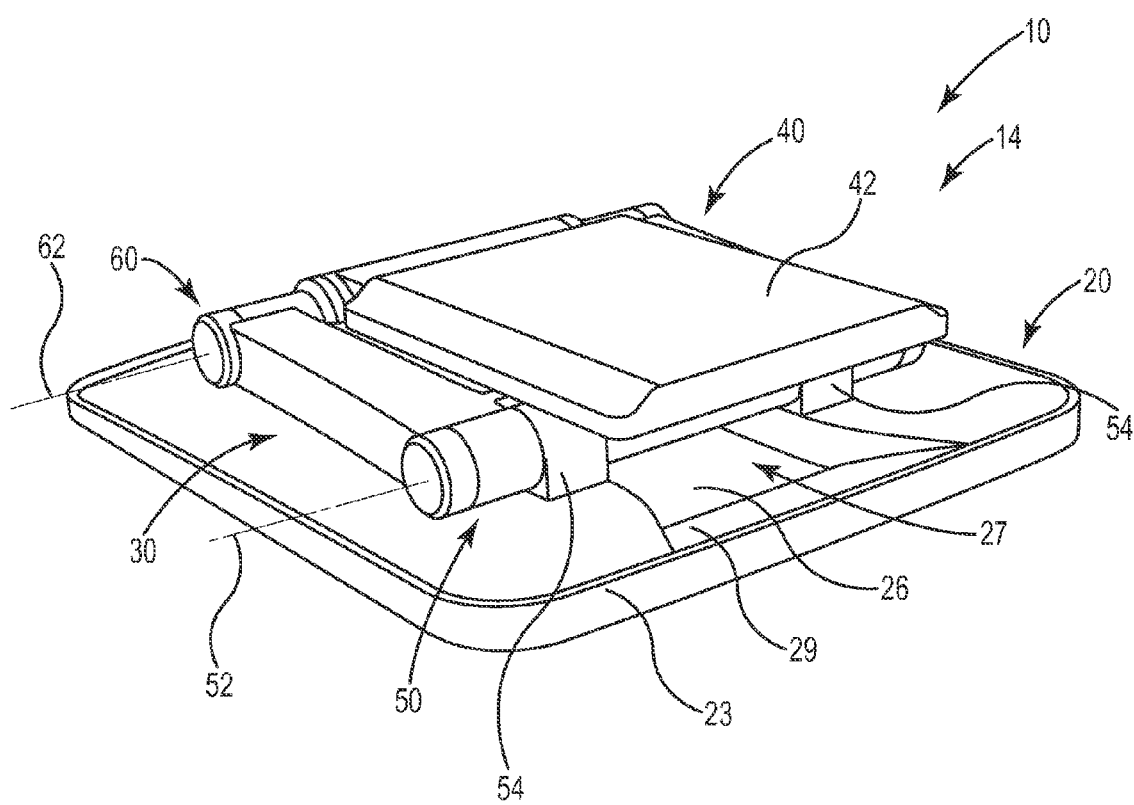
FIG. 4 illustrates a rear perspective view of an embodiment of a display device stand in a collapsed position.

FIGS. 1 and 2 illustrate a stand 10 for a display device. As described herein, stand 10 provides support for a display device and allows a user to move and/or adjust an angular and/or elevational position of the display device. Also as described herein, stand 10 accommodates one or more electrical cables (power, data, etc.) connected to a display device while a display device is supported by stand 10.

In one embodiment, stand 10 includes a base 20, a first support, such as member 30, and a second support, such as member 40. Member 30 is supported by and pivotally coupled to base 20, and member 40 is supported by and pivotally coupled to member 30, as further described herein. As such, member 40 provides a support surface or support structure 42 for a display device, as further described herein.

As illustrated in FIGS. 1 and 2, base 20 includes a top surface 21, a front portion or edge 22, and a rear or back portion or edge 23. In addition, base 20 includes a first side portion 24 and a second side portion 25 spaced from and opposite of first side portion 24.

In one embodiment, a recessed portion or opening 26 is formed in base 20. As such, recessed portion or opening 26 forms a channel or passage 27 in base 20 to accommodate one or more electrical cables connected to a display device supported by stand 10, as further described herein. In one example, channel or passage 27 is formed between first side portion 24 and second side portion 25 in a center or central portion of base 20.

In the embodiment of FIGS. 1 and 2, base 20 includes a ramp or sloped portion 28 at one end of channel or passage 27, and a ramp or sloped portion 29 at an opposite end of channel or passage 27. Ramp or sloped portion 28 extends between first side portion 24 and second side portion 25 along front portion or edge 22 of base 20, and ramp or sloped portion 29 extends between first side portion 24 and second side portion 25 along back portion or edge 23 of base 20. Ramp or sloped portion 28 includes a surface declined toward channel or passage 27, and ramp or sloped portion 29 includes a surface declined toward channel or passage 27 such that ramp or sloped portion 28 is declined in one direction toward channel or passage 27, and ramp or sloped portion 29 is declined in an opposite direction toward channel or passage 27.

As illustrated in FIGS. 1 and 2, member 30 is connected to base 20 by a hinge assembly or coupling 50, and member 40 is connected to member 30 by a hinge assembly or coupling 60. In one embodiment, hinge assembly or coupling 50 is provided at one end of member 30, and hinge assembly or coupling 60 is provided at an opposite end of member 30. Hinge assembly or coupling 50 has a pivot axis 52 and hinge assembly or coupling 60 has a pivot axis 62 such that member 30 is pivotable about pivot axis 52 relative to base 20, and member 40 is pivotable about pivot axis 62 relative to member 30. In this regard, member 30 and member 40 are both independently pivotable and adjustable relative to base 20, as further described herein.

In one embodiment, hinge assembly or coupling 50 is tensioned or frictioned and hinge assembly or coupling 60 is tensioned or frictioned such that member 30 is positionable at various angles relative to base 20 and member 40 is positionable at various angles relative to member 30 to establish various angular and elevational positions of stand 10, as further described herein.

Hinge assembly or coupling 50 is supported by base 20, and spans channel or passage 27. In one example, hinge assembly or coupling 50 includes pivot or hinge mounts, such as supports 54, positioned on top surface 21 of base 20 on opposite sides of channel or passage 27 with one support 54 positioned on first side portion 24 of base 20, and one support 54 positioned on second side portion 25 of base 20.

As illustrated in FIGS. 1 and 2 and FIGS. 3 and 4, stand 10 is configurable or adjustable between at least one raised or extended position 12 and a folded or collapsed position 14. More specifically, member 30 and member 40 are pivotable about pivot axis 52 and pivot axis 62, respectively, and independently moveable or adjustable to establish raised or extended position 12 and folded or collapsed position 14 relative to base 20. In one embodiment, with stand 10 in folded or collapsed position 14, member 30 is pivoted toward base 20 to overlay base 20, and member 40 is pivoted toward member 30 to overlay member 30. As described herein, folded or collapsed position 14 establishes a low profile or compact configuration of stand 10. As such, the compact configuration may be useful, for example, for storing and/or shipping of stand 10.

Figure 5:
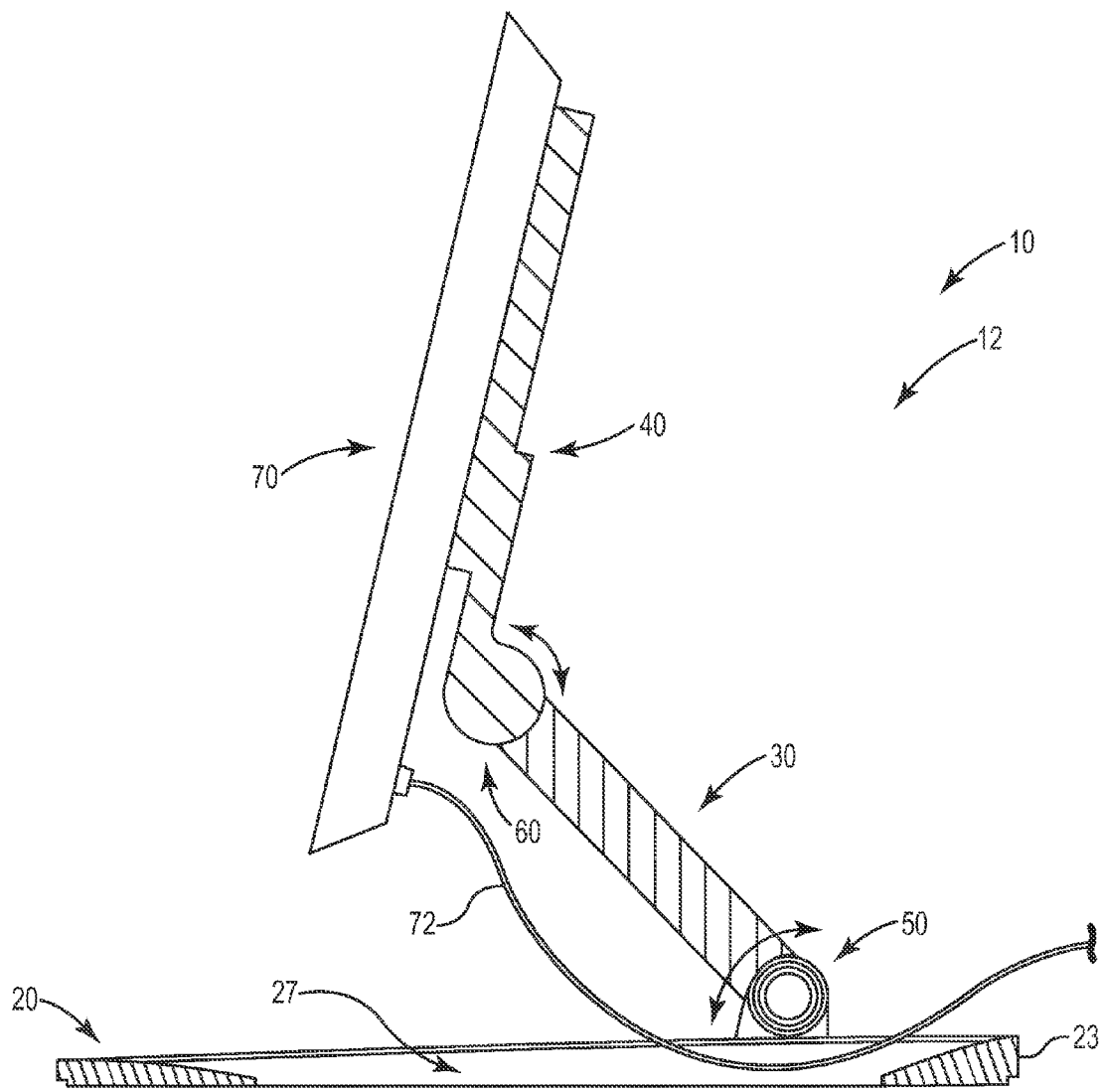
FIG. 5 illustrates a cross-sectional view of an embodiment of a display device stand in an extended position supporting a display device.
Figure 6:
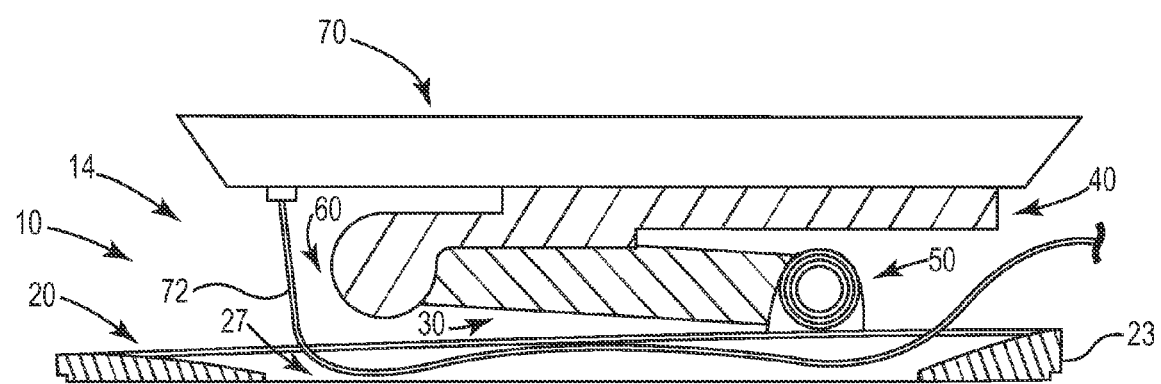
FIG. 6 illustrates a cross-sectional view of an embodiment of a display device stand in a collapsed position supporting a display device.

As illustrated in the embodiment of FIGS. 5 and 6, stand 10 supports or provides attachment for a display device 70. Display device 70 may be a stand-alone display device, such as a flat-panel display or monitor, or may be incorporated into an electronic/computing device, including a portable electronic/computing device such as a tablet computer, a personal digital assistant, a smartphone or other mobile computing device. As part of an electronic/computing device, display device 70 may be supported by a housing containing other computing components such as a processor, a motherboard, volatile and nonvolatile memory (e.g., a hard drive, RAM, ROM, flash memory, cache memory, etc.), network circuitry (e.g., a modem, a network card, etc.), wireless communications circuitry (e.g., IR, RF, optical, and other technologies), input/output ports, audio/video circuitry, and various other circuitry, components, and component receptacles/bays.

In one embodiment, one or more electrical cables, illustrated as a single electrical cable 72 in FIGS. 5 and 6, are connected or attached to display device 70. Electrical cable 72 may provide power and/or input/output of data or other communication with display device 70. Electrical cable 72 may also provide communication with one or more peripheral devices such as a printer, a scanner, a digital camera, a keyboard, a mouse, and/or various other input/output devices.

With display device 70 support by or secured to stand 10, stand 10 accommodates routing or pass through of electrical cable 72 through stand 10. For example, in raised or extended position 12 illustrated in FIG. 5, channel or passage 27 of base 20 provides routing of electrical cable 72 between member 30 and base 20, and under hinge 50, for management of electric cable 72 and routing of electrical cable 72 to and/or beyond rear portion 23 of base 20. As such, electrical cable 72 does not interfere with rotational movement and/or height adjustment of stand 10 in establishing different angular and/or elevational positions of display device 70.

In addition, in folded or collapsed position 14 illustrated in FIG. 6, channel or passage 27 of base 20 provides routing of electrical cable 72 between member 30 and base 20, and under hinge assembly 60, under member 30 and under hinge assembly 50, for routing of electrical cable 72 to and/or beyond rear portion 23 of base 20. As such, pinching, binding or crimping of electrical cable 72 by stand 10 is avoided. In addition, electrical cable 72 does not limit a lowered or lowest height of stand 10 when stand 10 is in folded or collapsed position 14. Thus, a low profile or compact configuration of stand 10 while supporting display device 70 may be established for storing and/or shipping of stand 10 and display device 70.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A display device stand, comprising:
    a base;
    a first member supported by the base; and
    a second member supported by the first member,
    wherein the first member is moveable between a collapsed position and at least one extended position, and wherein the base provides a passage under and between opposite ends of the first member with the first member in the collapsed position.

2. The display device stand of claim 1, further comprising:
    a first hinge coupling between the base and the first member; and
    a second hinge coupling between the first member and the second member.

3. The display device stand of claim 2, wherein the first hinge coupling includes a first pivot axis, and the second hinge coupling includes a second pivot axis substantially parallel with the first pivot axis.

4. The display device stand of claim 2, wherein the base provides the passage under the first hinge coupling and under the second hinge coupling with the first member in the collapsed position.

5. The display device stand of claim 2, wherein the base provides the passage under the first hinge coupling with the first member in the at least one extended position.

6. A stand for a display device, comprising:
    a base;
    a first support pivotally coupled to the base; and
    a second support pivotally coupled to the first support,
    wherein the base includes a recessed portion, wherein the first support spans the recessed portion and is pivotable between a folded position and at least one raised position, and wherein the recessed portion remains open with the first support in the folded position.

7. The stand of claim 6, wherein the recessed portion of the base comprises an opening the base.

8. The stand of claim 6, wherein the base includes a first sloped portion at one end of the recessed portion and a second slope portion at an opposite end of the recessed portion.

9. The stand of claim 6, wherein the first support is pivotally coupled to the base about a first pivot axis, and the second support is pivotally coupled to the first support about a second pivot axis.

10. The stand of claim 6, wherein the first support is pivotally coupled to the base at a first end of the first support, and the second support is pivotally coupled to the first support at a second end of the first support.

11. The stand of claim 6, wherein the second support is configured to support the display device.

12. A system, comprising:
    a stand including a base, a first support pivotally coupled to the base, and a second support pivotally coupled to the first support; and
    a display device supported by the second support of the stand,
    the display device having at least one electrical cable connected thereto, and the base of the stand including a recessed portion providing a routing for the electrical cable through the base and under the first support while the first support is rotated between an extended position and a collapsed position relative to the base.

13. The system of claim 12, wherein the first support is pivotally coupled to the base at a first end of the first support and the second support is pivotally coupled to the first support at a second end of the first support, and wherein the routing for the electrical cable extends under and between the first end and the second end of the first support.

14. The system of claim 12, wherein the first support is pivotally coupled to the base about a first axis, and the second support is pivotally coupled to the first support about a second axis substantially parallel with the first axis.

15. The system of claim 12, wherein the display device is incorporated in a computing device.

* * * * *